United States Patent
Aeberhard et al.

(10) Patent No.: US 9,921,011 B2
(45) Date of Patent: Mar. 20, 2018

(54) VALVE CONTROL IN AN HVAC SYSTEM WITH SENSORS

(71) Applicant: BELIMO HOLDING AG, Hinwil (CH)

(72) Inventors: Ronald Aeberhard, Grut (CH); Marc Thuillard, Uetikon am See (CH); Philipp Mazenauer, Jona (CH)

(73) Assignee: BELIMO HOLDING AG, Hinwil (CH)

( * ) Notice: Subject to any disclaimer, the term of this patent is extended or adjusted under 35 U.S.C. 154(b) by 449 days.

(21) Appl. No.: 14/559,564

(22) Filed: Dec. 3, 2014

(65) Prior Publication Data
US 2015/0176931 A1 Jun. 25, 2015

(30) Foreign Application Priority Data
Dec. 20, 2013 (CH) ...................... 2119/13

(51) Int. Cl.
*F28F 27/00* (2006.01)
*F24F 11/00* (2018.01)

(52) U.S. Cl.
CPC .......... *F28F 27/00* (2013.01); *F24F 11/008* (2013.01); *F24F 11/0009* (2013.01); *F24F 2011/0052* (2013.01); *F24F 2011/0082* (2013.01)

(58) Field of Classification Search
CPC ..................................... F28F 27/00
USPC ............................................. 700/1
See application file for complete search history.

(56) References Cited

U.S. PATENT DOCUMENTS

| | | | | |
|---|---|---|---|---|
| 4,719,767 A | * | 1/1988 | Reid, Jr. ............. | C09K 5/047 62/324.2 |
| 5,630,325 A | | 5/1997 | Bahel et al. | |
| 5,806,582 A | * | 9/1998 | Santavuori ......... | F24F 11/0009 165/104.31 |
| 6,313,470 B1 | * | 11/2001 | Fencl ................. | A61L 2/10 250/454.11 |

(Continued)

FOREIGN PATENT DOCUMENTS

| | | |
|---|---|---|
| EP | 0216547 A2 | 4/1987 |
| EP | 2339256 A2 | 6/2011 |
| GB | 2100474 A | 12/1982 |

OTHER PUBLICATIONS

Communication dated May 6, 2014 from the European Patent Office in counterpart application No. 21192013.

*Primary Examiner* — Christopher E Everett
(74) *Attorney, Agent, or Firm* — Sughrue Mion, PLLC

(57) ABSTRACT

The present disclosure is directed towards a method of controlling opening of a valve (10) in an HVAC system (100). The method includes controlling the opening of the valve (10) according to a default control mode in dependence of a default sensor signal. The method further includes determining, while controlling the opening of the valve (10) according to the default control mode, whether the default sensor signal is faulty and switching, in case of the default sensor signal being faulty, to controlling the opening of the valve (10) according to a fallback control mode, with the opening of the valve (10) being controlled independently of the faulty sensor signal in the fallback control mode. The present invention is further directed towards a corresponding control device opening of a valve (10) in an HVAC system as well as a corresponding computer program product.

16 Claims, 5 Drawing Sheets

(56) References Cited

U.S. PATENT DOCUMENTS

| | | | |
|---|---|---|---|
| 7,130,719 B2* | 10/2006 | Ehlers | F24F 11/0012 |
| | | | 700/276 |
| 7,246,941 B2* | 7/2007 | Shike | G01K 13/00 |
| | | | 374/141 |
| 2004/0133314 A1* | 7/2004 | Ehlers | F24F 11/0012 |
| | | | 700/276 |
| 2006/0005554 A1* | 1/2006 | Okada | F24F 11/008 |
| | | | 62/183 |
| 2006/0150644 A1* | 7/2006 | Wruck | F24F 11/0017 |
| | | | 62/126 |
| 2012/0291984 A1 | 11/2012 | Li et al. | |
| 2014/0097367 A1* | 4/2014 | Burt | F24D 19/1015 |
| | | | 251/129.04 |
| 2014/0174543 A1* | 6/2014 | Rannow | F15B 20/00 |
| | | | 137/1 |
| 2014/0277764 A1* | 9/2014 | Burt | G05B 15/02 |
| | | | 700/276 |
| 2015/0176931 A1* | 6/2015 | Aeberhard | F28F 27/00 |
| | | | 165/200 |

\* cited by examiner

VALVE CONTROL IN AN HVAC SYSTEM WITH SENSORS

FIELD OF THE INVENTION

The present invention relates to a method and a device for controlling the opening of a valve in a Heating, Ventilating and Air Conditioning (HVAC) system. Specifically, the present invention relates to a method and a control device for controlling the opening of a valve in an HVAC system to regulate the flow of a fluid through a heat exchanger of the HVAC system and to thereby adjust the amount of energy exchanged by the heat exchanger.

BACKGROUND OF THE INVENTION

By regulating the flow of fluid through heat exchangers of an HVAC system, it is possible to adjust the amount of energy exchanged by the heat exchangers, for example to adjust the amount of energy that is delivered per time by a heat exchanger to heat or cool a room in a building or the amount of energy that is drawn by a chiller per time for cooling purposes. While the fluid transport through the fluid circuit of the HVAC system is driven by one or more pumps, the flow is typically regulated by varying the opening or position of valves, for example manually or by way of actuators. It is known that the efficiency of heat exchangers is reduced at high flow rates where the fluid rushes at an increased rate through the heat exchangers, without resulting in a significant increase in energy exchange.

State-of-the-art HVAC systems may include a variety of sensors, such as temperature sensors, flow sensors, and/or pressure sensors. Fluid flow in the HVAC system is controlled in dependence of sensor signals according to a variety of criteria and control algorithms.

With the number of sensors or sensor systems that are involved in the control of an HVAC system, as well as the complexity of the sensors or sensor systems, the risk of permanent or temporary sensor faults increases accordingly.

EP 2 339 256 discloses a method for controlling an air conditioner that comprises a plurality of indoor units. According to EP 2 339 256, the method calculates a replacement sensor value for an indoor unit, in case of a breakdown of a temperature sensor of any of the indoor units and controls the indoor unit based on the calculated value of the sensor. Specifically, the method of EP 2 339 256 calculates the sensor value for a temperature sensor of the inlet pipe to the respective indoor unit based on a temperature value measured by a temperature sensor of the outlet pipe from that indoor unit.

U.S. Pat. No. 5,630,325 discloses a controller for a heat pump system that includes a refrigerant compressor and an electrically controlled expansion valve. The controller compares the temperature of the refrigerant discharged from the compressor to predetermined extreme values, indicative of an alert condition. If the discharge temperature is above the predetermined extreme temperature, the discharge temperature is used to control the setting of the expansion valve; otherwise, the expansion valve is set to a predetermined setting.

SUMMARY OF THE INVENTION

It is an object of this invention to provide a method and a device for controlling the opening of a valve in an HVAC, which method and device do not have at least some of the disadvantages of the prior art. In particular, it is an object of the present invention to provide a method and a device for controlling opening of a valve in an HVAC system, which method and device improve the tolerance of the HVAC system with respect to sensor faults.

According to the present invention, these objects are achieved through the features of the independent claims. In addition, further advantageous embodiments follow from the dependent claims and the description.

According to the present invention, the above-mentioned objects are particularly achieved by providing a method of controlling opening of a valve in an HVAC system to regulate the flow $\varphi$ of a fluid through a heat exchanger of the HVAC system. Via the flow $\varphi$, the amount of energy per time, E, that is exchanged by the heat exchanger, can be adjusted. The method includes controlling the opening of the valve according to a default control mode in dependence of a default sensor signal, the default sensor signal being indicative of at least one parameter of the HVAC system.

The at least one parameter of which the default sensor signal is indicative of may especially include one or more parameters of the fluid flow through the heat exchanger and/or parameter of the fluid. The following description mainly focuses on the flow $\varphi$ and/or a temperature difference $\Delta T$ between a supply temperature of the fluid entering the heat exchanger and a return temperature of the fluid exiting the heat exchanger. Alternatively or additionally, however, further parameters may be used, such as a room temperature, air humidity, or the presence and/or amount of dew. The presence and/or amount of dew may be determined by a dew sensor or humidity sensor that may be arranged, for example at or in proximity to tubing of a fluid circuit of the HVAC system.

In the following description the valve is exemplarily assumed to be a flow control valve having a single inlet and a single outlet. It may, however, also be a differently and potentially more complex designed valve, such as a three-way-valve or a six-way-valve.

The method further includes determining, while controlling the opening of the valve according to the default control mode, whether the default sensor signal is faulty. The method further includes switching, in case of the default sensor signal being faulty, to controlling the opening of the valve according to a fallback control mode, with the opening of the valve being controlled independently of the faulty sensor signal in the fallback control mode.

The default control mode is a "regular" control mode under "normal" operating conditions, where the opening of the valve is controlled when no sensor signal fault is present or at least no sensor signal fault has been detected. The method may especially include controlling a control parameter that is associated with the HVAC system to a setpoint value. Exemplary control parameters are discussed further below.

In the context of this document, a sensor signal is referred to as "faulty", if, for any reasons, it does not reflect correctly the parameter it is intended to reflect and the corresponding parameter is, thus, not correctly measured. The reasons for which a sensor signal may be faulty are various and include, for example, a hardware defect of a sensing element as such; a defect of associated components or circuitry, such as wiring, power supply, or signal processing circuitry like amplifiers or analogue-to-digital-converters; dirt, sediments, contamination, or the like, which may disturb operation of a sensing element. Examples of faulty sensor signals and criteria for assessing whether a sensor signal is faulty will be discussed further below in the context of exemplary embodiments. A non-faulty sensor signal, i.e., a sensor signal that correctly reflects the measured parameter, is also referred to as "valid" in the following description.

For example, the step of determining whether the default sensor signal is faulty, is performed by a sensor testing unit, as will be discussed further below. Typically, the opening of the valve is controlled by providing a control signal Z to an actuator. The actuator is operatively coupled to the valve for controlling the opening of the valve. In an embodiment, for generating the control signal Z, at least two control signal generators are provided, with one control signal generator generating a default control signal for controlling the opening of the valve in the default control mode, and another control signal generator generating a fallback control signal for controlling the opening of the valve in the fallback control mode. For example, a step of determining which control signal generators is to be used for controlling the control signal Z is carried out by a control mode selection unit that is operatively coupled to the control signal generators.

The fallback control mode is in any case a control mode that does not rely on the faulty sensor system. As will be discussed in the following paragraphs, the fallback control mode may be a control mode that generally operates differently from the default control mode and uses, e.g. a different control variable, and operates according to a different control algorithm. Alternatively, however, the fallback control mode may operate in the same way and/or according to the same control algorithm as the default control mode, but replace the faulty sensor signal by a sensor signal replacement. The sensor signal replacement may be a fixed value, for example, corresponding to a value of the sensor signal that was measured shortly before the signal becoming faulty. Likewise, more advanced approaches may be used, such as an extrapolation of the sensor signal becoming faulty. In embodiments where the default sensor signal includes a number of sensor sub-signals, as will be described further below, only the faulty sensor sub-signal is replaced with the valid, i.e. non-faulty signal(s), being continuedly used for the control.

The method further includes determining, while controlling the opening of the valve according to the fallback control mode, whether the previously faulty default sensor signal is non-faulty, and, in case of the default sensor signal being non-faulty, switching back to controlling the opening of the valve according to the default control mode.

Switching back to the default control mode, if and when the default sensor is no longer faulty, has the advantage that the method dynamically switches back to the preferred default control mode when the respective sensor and/or its operation and/or connection has been replaced or repaired, respectively. As will become more readily apparent in the following description, the fallback control mode is generally less sophisticated and/or shows lower control performance, because it does not rely on the default sensor signal. It is accordingly desirable to switch back to the default control mode, if and when the default sensor signal is valid again and the default control mode is accordingly available again.

In a variant, different fallback control modes may be used in dependence of the time for which the sensor signal is faulty. When determining that the default sensor signal is faulty, it may first be switched to controlling the opening of the valve according to a short-term fallback control mode where the faulty sensor signal or sensor sub-signal is replaced. If the default sensor system continues being faulty for an extended time period, control of the valve opening may be switched from the short-term fallback control mode to a further long-term fallback control mode. This long-term fallback control mode may be either of the fallback control modes that will be discussed below, for example. Providing a dedicated short-term fallback control mode may be regarded as providing some low pass characteristic to the sensor signal. Short term fallback control modes are especially useful for dealing with short-term faults or distortions of sensor signals, as resulting, for example, from dirt particles or air bubbles in the fluid flow.

In some embodiments, the method further includes controlling the opening of the valve in the fallback control mode in dependence of a fallback sensor signal. In those embodiments, the method further includes determining, while controlling the opening of the valve according to the fallback control mode, whether the fallback sensor signal is faulty. In those embodiments, the method further includes, in case of the fallback sensor signal being faulty, switching to controlling the opening of the valve according to a further fallback control mode. In the further fallback control mode, the opening of the valve is controlled independently of the faulty fallback sensor signal.

For this type of embodiment, the same principle that is applied to switching from the default control mode to the fallback control mode is applied to the case where a fallback sensor signal is faulty on which valve control relies in the fallback control mode. The fallback control mode may be considered as new default operation mode and the further fallback control mode may be considered as new fallback control mode.

In variants, a plurality of fallback control modes and/or further fallback control modes are available.

In some embodiments, the default sensor signal includes a set of sensor sub-signals, the sensor sub-signals reflecting different parameters of the fluid flow through the heat exchanger. Controlling the opening of the valve in dependence of a set of parameters rather than a single parameter enables the application of advanced and sophisticated control algorithms that are required for complex control tasks and especially for energy optimized operation of HVAC systems. For this type of embodiment, the sensor signal may be considered as a vector, with the sensor sub-signals being the vector elements. The sensor signal is considered as being faulty, if at least one of its sensor sub-signals is faulty. In embodiments where valve control relies on a fallback sensor signal, in the fallback control mode, this fallback sensor signal may include some or all of the valid sensor sub-signals of the default sensor signal, but no faulty sensor sub-signal(s). Examples of corresponding control modes and sensor signals will be discussed further below.

In some embodiments, the method includes selecting the fallback control mode from a set of alternative fallback control modes. Providing a set of alternative fallback control modes allows the valve control to be carried out in different ways, in case of a faulty sensor signal. In a variant, an appropriate fallback control mode depends on the operational state and operational conditions of further components of the HVAC system. In embodiments where the default sensor signal includes a set of sensor sub-signals, either of the sensor sub-signals may independently be faulty. This type of embodiment accordingly allows selecting the fallback control mode in dependence of which sensor sub-signal(s) is/are faulty and which sensor sub-signal(s) is/are still valid (functional) and therefore available.

In some embodiments, including a set of alternative fallback control modes, the alternative fallback control modes establish, in combination with the default control mode, a control mode hierarchy. For this type of embodiment, the method further includes selecting the fallback control mode as a highest-ranking available control mode. In some embodiments with a control mode hierarchy, the method includes, while controlling the opening of the valve according to the fallback control mode, determining whether a higher ranking control mode is available, and, in case of a higher ranking control mode being available, switching to controlling the opening of the valve according to the higher-ranking control mode.

The default control mode is generally the most sophisticated control mode or the most preferred control mode in accordance with the overall design and setup of the HVAC system, with the control performance decreasing for the control mode with lower-ranking control modes. Accordingly, this type of embodiment ensures that the valve is generally controlled with the highest-ranking control mode, i.e. the control mode of best performance that is available under given circumstances. The different control modes may especially vary with respect to the number and type of sensor (sub-)signals they rely on. Further aspects of a control mode hierarchy will be discussed further below in the context of exemplary embodiments.

In some embodiments, the default control mode is a power control mode. In the power control mode, an amount of energy per time E that is exchanged by the heat exchanger is controlled to a setpoint power value (target power value). In a power control mode, the energy per time E accordingly serves as control parameter. The energy per time E has the physical dimension of power. The energy per time, E, can be determined by the product of the flow $\varphi$ and the temperature difference $\Delta T$ between a supply temperature $T_{in}$ of the fluid entering the heat exchanger and a return temperature $T_{out}$ of the fluid exiting the heat exchanger. A flow signal $\varphi^*$ and a temperature difference signal $\Delta T^*$ may accordingly serve as sensor sub-signals. Accordingly, the power control mode requires both the flow signal $\varphi^*$ and the temperature difference signal $\Delta T^*$ to be valid (non-faulty).

Here and in the following description, sensor signals that are indicative of and reflect a physical parameter, in particular, a parameter of the fluid flow, are labeled by the same symbol as the physical parameter, followed by a star symbol, "*".

It is to be noted that in the context of the present document the phrase "setpoint value" is used to indicate a value serving as control setpoint and may be constant or variable over time. The setpoint value may be manually provided and input by a user or calculated automatically, for example by an overall building control system.

In some embodiments, the default sensor signal includes at least one of a flow signal $\varphi^*$ and a temperature difference signal $\Delta T^*$. The flow signal $\varphi^*$ is indicative of the flow $\varphi$. The temperature difference signal $\Delta T^*$ is indicative of a temperature difference $\Delta T = T_{in} - T_{out}$ between a supply temperature $T_{in}$ of the fluid entering the heat exchanger and a return temperature $T_{out}$ of the fluid exiting the heat exchanger.

In some embodiments where the default control mode is a power control mode, the fallback control mode is a pressure-independent control mode where the flow $\varphi$ is controlled to a setpoint flow value independent of a fluidic pressure of the fluid. Accordingly, a pressure-independent control mode may also be referred to as flow control mode. In a pressure-independent control mode, the flow $\varphi$ accordingly serves as control parameter. While valve control in a pressure-independent control mode requires the flow signal $\varphi^*$ to be valid, the temperature difference signal $\Delta T^*$ is not required. A pressure-independent control mode may accordingly serve as fallback control for a power control mode as default control mode in case of the temperature difference signal $\Delta T^*$ being faulty. For this type of embodiment, the default sensor signal accordingly comprises both the flow signal $\varphi^*$ and the temperature difference signal $\Delta T^*$ as sensor sub-signals, while the fallback sensor signal is or comprises the flow signal flow signal $\varphi^*$, but not the temperature difference signal $\Delta T^*$. A set point flow value for controlling the opening of the valve in the pressure-independent control mode may be user-set and/or factory-set and may be stored, e.g. in a control device. Alternatively, a setpoint flow value may be determined automatically upon switching to the pressure-independent control mode as fallback control mode. The setpoint flow value may especially be set to the value of the flow $\varphi$ that was measured by the flow sensor at a point in time shortly before the temperature difference signal $\Delta T^*$ becoming faulty. The same principle may be applied to other fallback control modes.

Generally, the method may accordingly include continuously or repeatedly storing, while controlling the opening of the valve according to the default control mode, a value of a fallback control parameter that is associated with the fluid flow through the heat exchanger as stored fallback setpoint value. In the fallback control mode, the fallback control parameter is controlled to the stored fallback setpoint value. In the example given before, the flow $\varphi$ serves as fallback control parameter. In embodiments which include controlling the opening of the valve in dependence of a fallback sensor signal, e.g. one or more valid sub-signals of the default sensor signals, a fallback control parameter may be a parameter that is reflected by the fallback sensor signal.

In some embodiments, the fallback control mode is an opening control mode, with the valve being controlled to a set degree (or position) of valve opening in the opening control mode. In an opening control mode, the valve opening accordingly serves as control parameter.

In an opening control mode, valve control may exclusively rely on a valve actuator, typically including an electric actuation drive which may or may not have drive internal sensors such as end switches, position sensors, speed sensors, tachometer generators, encoders, and the like.

An opening control mode may serve as fallback control mode for a pressure-independent control mode as default (standard) operation mode, for the case of the temperature difference signal $\Delta T^*$ being faulty. Likewise, it may serve as fallback control mode for a valve operating in a power control mode as default control mode in case of the flow signal $\varphi^*$ being faulty. In a more general sense, an opening control mode may further serve as lowest ranking or "worst case" fallback control mode in a control mode hierarchy as described before. In further embodiments, an opening control mode is the only fallback control mode to which valve control is switched whenever the default sensor signal is faulty.

In some embodiments, the valve is a six-way-valve to fluidically couple an inlet side and an outlet side of the heat exchanger alternatively with a first fluidic circuit in a first default control mode or a second fluidic circuit in a second default control mode. For those embodiments, the method includes selecting the default control mode as selected default control mode from the first default control mode and the alternative second default control mode. The method further includes switching, in case of the default sensor signal being faulty, to controlling the opening of the valve according to a first fallback control mode or an alternative second fallback control mode, in dependence of the selected default control mode.

A six-way valve may be used in an HVAC system to fluidicly couple an inlet side and an outlet side of a heat exchanger to alternative fluidic circuits, such as a heating circuit and an additionally present cooling circuit. One of the first and second default control modes is accordingly a heating mode while the other mode is a cooling mode. The first fallback control mode serves as fallback control mode for the first default control mode and the second fallback control mode serves as fallback control mode for the second default control mode. If, for example, the first default control mode is a heating mode the first fallback control mode is a heating mode too. Similarly, both the second default control mode and the second fallback control mode are cooling modes. The criteria for determining a faulty sensor signal or sensor sub-signal, as discussed further below, typically also depend on the selected default control mode for this type of embodiment.

The principle of providing a number of alternative default control modes and corresponding fallback control modes, however, is not restricted to two modes but may be applied to another number of control modes as well. Likewise, the principle may be applied for the control of other valves than six-way-valves.

In some embodiments, the method further includes providing a user alert, for example, by providing an optical and/or acoustical alerting signal when switching from the current control mode to the fallback control mode. Similarly, a user alert may be provided when switching from the fallback control mode back to the current control mode. For example, alerts may be provided by a control device that controls the opening of the valve, or by a central building control system that is operatively coupled to the control device. Alternatively or additionally, alerting signals may be transmitted to wireless remote devices, for example to a pager device or a cell phone via a corresponding communication network.

In some embodiments, the method further includes storing or locking protocol data related to sensor faults, such as one or more of points in time when a sensor signal is determined to be faulty or non-faulty, when control modes are switched, e.g. from the current control mode and potential backup mode to the current control mode, and/or when a sensor provides a faulty signal, and/or an indication of the faulty signal, the fallback control mode, and the like. Such protocol data may be stored, for example, in non-volatile memory or on a hard disk.

According to a further aspect of the present invention, the before-mentioned objects are achieved by providing a control device for controlling opening of a valve in an HVAC system to regulate the flow $\varphi$ of a fluid through a heat exchanger of the HVAC system and adjust the amount of energy per time E that is exchanged by the heat exchanger. The control device is configured to operatively couple to at least one sensor for receiving a default sensor signal. The control further includes a processor, the processor being configured to control the opening of the valve according to a default control mode in dependence of the default sensor signal, the sensor signal reflecting at least one parameter of the fluid flow through the heat exchanger. The processor is further configured to determine, while controlling the opening of the valve according to the default control mode, whether the default sensor signal is faulty. The processor is further configured to switch, in case of the default signal being faulty, to controlling the opening of the valve according to a fallback control mode, with the opening of the valve being controlled independently of the faulty default sensor signal in the fallback control mode. The processor is further configured to determine, while controlling the opening of the valve according to the fallback control mode, whether the previously faulty default sensor signal is non-faulty, and to switch back to controlling the opening of the valve according to the default control mode, in case of the default sensor signal being non-faulty.

The control device may be implemented as compact physical unit which has, for example, a compact casing and may also be structurally coupled to the valve it controls. Alternatively, the control device is implemented by a number of physical units in wired and/or wireless operative coupling.

In some embodiments, the at least one sensor includes a flow sensor and/or a temperature difference sensor. The flow sensor is configured to provide a flow signal $\varphi^*$, indicative of the flow $\varphi$. The temperature difference sensor is configured to provide a temperature difference signal $\Delta T^*$ indicative of a temperature difference $\Delta T = T_{in} - T_{out}$ between a supply temperature $T_{in}$ of the fluid entering the heat exchanger and a return temperature $T_{out}$ of the fluid exiting the heat exchanger.

Sensors may be external to the control device and coupled to the control device via wired or wireless connection, or may be, fully or partly, structurally integral or in rigid mechanical engagement with the control device, or may be partly within the control device and partly external.

In some embodiments, the processor includes a sensor testing unit, the sensor testing unit being configured to determine whether the standard sensor is faulty.

In some embodiments, the processor includes a control mode selection unit and at least two control signal generators operatively coupled to the control mode selection unit. The control signal generators are configured to alternatively generate a control signal Z for an actuator. The actuator is coupled to the valve for controlling the opening of the valve.

It is to be noted that a processor of the control device may especially be configured to carry out a method according to any or more embodiments of a method according to the present invention. Therefore, all embodiments of a method for controlling the opening of a valve disclose, at the same time, a control device with a processor that is configured to carry out the corresponding steps. Likewise, disclosed embodiments of a control device that is configured to carry out method steps in accordance with the present invention disclose—at the same time—the corresponding method steps as such.

According to a further aspect of the present invention, the before-mentioned objectives are achieved by a computer program product. The computer program product includes a non-transient computer readable medium having stored therein computer program code configured to direct a processor of a control device for controlling opening of a valve in an HVAC system to regulate the flow $\varphi$ of a fluid through a heat exchanger of the HVAC system and adjust the amount of energy per time that is exchanged by the heat exchanger by:

controlling the opening of the valve according to a default control mode in dependence of a default sensor signal, the default sensor signal reflecting at least one parameter of the fluid flow through the heat exchanger;

determining, while controlling the opening of the valve according to the default control mode, whether the default sensor signal is faulty;

switching, in case of the default sensor signal being faulty, to controlling the opening of the valve according to a fallback control mode, with the opening of the valve being controlled independently of the faulty default sensor signal in the fallback control mode;

determining, while controlling the opening of the valve according to the fallback control mode, whether the previously faulty default sensor signal is non-faulty, and switching back to controlling the opening of the valve according to the default control mode, in case of the default sensor signal being non-faulty.

BRIEF DESCRIPTION OF THE DRAWINGS

The present invention will be explained in more detail, by way of example, with reference to the drawings in which.

DETAILED DESCRIPTION OF EXEMPLARY EMBODIMENTS

Figure 1:
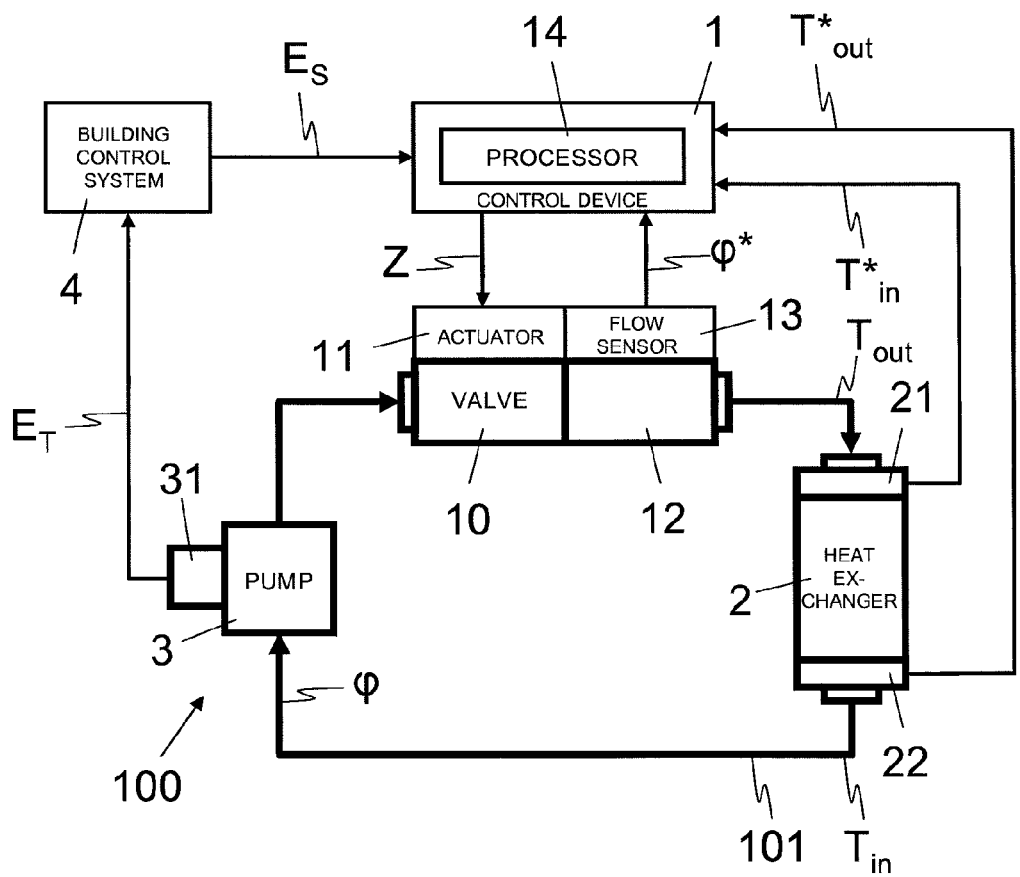
FIG. 1: shows a block diagram illustrating schematically an HVAC system with a fluid circuit comprising a pump, a valve, and a heat exchanger, and a control device for controlling the opening of the valve to regulate the amount of power exchanged by the heat exchanger.

In FIG. 1, reference numeral 100 refers to an HVAC system with a fluid circuit 101 comprising a pump 3, a valve 10, a heat exchanger 2, for example a heat exchanger for heating or cooling a room, with the components of the fluid circuit being interconnected by way of pipes. The valve 10 is provided with an actuator 11, for example an electrical motor, for opening and closing the valve 10 and thus controlling the flow through the fluid circuit 101, using different positions (or sizes of orifice) of the valve 10, corresponding to different degrees of opening of the valve 10. Further, the pump 3 may vary the flow through the fluid circuit 101.

As illustrated schematically, the HVAC system 100 further comprises an optional building control system 4 connected to the valve 10 or actuator 11, respectively. One skilled in the art will understand that the depiction of the HVAC system 100 is very simplified and that the HVAC system 100 may include a plurality of fluid circuits 101, having in each case one or more pumps 3, valves 10, heat exchangers 2, and further heat exchangers, such as chillers. The HVAC system 100 may further include a heater for heating the liquid.

In the present description, the fluid circulating in the fluid circuit 101 is considered to be a liquid heat transportation medium, such as water. In alternative embodiments, the fluid may be a gas, such as air, or any special purpose medium as used in the internal fluidics of an HVAC system. The thermal heat exchanger may alternatively be, for example, a cooler or a thermal heat exchanger internal to the HVAC system.

As further illustrated schematically in FIG. 1, the heat exchanger 2 is provided with two temperature sensors 21, 22 that are arranged at the inlet of the heat exchanger 2, for measuring the supply temperature $T_{in}$ of the fluid entering the heat exchanger 2, and at the exit of the heat exchanger 2, for measuring the return temperature $T_{out}$ of the fluid exiting the heat exchanger 2. The temperature sensors provide signals $T^*_{in}$, $T^*_{out}$ which are indicative of and reflect the supply temperature $T_{in}$ and the return temperature $T_{out}$ in an analogue or digital representation. As will be discussed further below, the temperature sensors 21, 21 are part of a temperature difference sensor (or temperature difference sensor system).

The fluid circuit 101 further comprises a flow sensor 13 for measuring the flow $\varphi$, i.e. the rate of fluid flow, through the valve 10 or fluid circuit 101, respectively. Depending on the embodiment, the flow sensor 13 is arranged in or at the valve 10, or in or at a pipe section 12 connected to the valve 10. For example, the flow sensor 13 is an ultrasonic flow sensor, an inductive-magnetic flow sensor, or a heat transport sensor. The flow sensor 13 provides a signal $\varphi^*$ which is indicative of and reflects the flow $\varphi$ in an analogue or digital representation. In an alternative embodiment where the fluid is a gas, such as air, a flow sensor may typically be implemented by a set of two pressure sensors and a flow-restricting aperture that is fluidically arranged between the pressure sensors.

In FIG. 1, reference numeral 1 refers to a control device for controlling the valve 10 or the actuator 11, respectively, to adjust the opening (or position or size of orifice) of the valve 10. Accordingly, the control device 1 regulates the flow $\varphi$, i.e. the rate of fluid flow, through the valve 10 and, thus, through the heat exchanger 2. Consequently, the control device 1 regulates the amount of thermal energy per time that is exchanged by the heat exchanger 2 with its environment. Depending on the embodiment, the control device 1 is arranged at the valve 10, for example as an integral part of the valve 10 or attached to the valve 10, or the control device 1 is arranged at a pipe section 12 connected to the valve 10.

The control device 1 comprises a processor 14, for example an operational microprocessor or microcontroller with program and data memory or another programmable circuit. The control device 1 comprises computer program code configured to direct the processor 14 or another programmable circuit of the control device 1 to perform various functions, as will be explained later in more detail in the following paragraphs. The computer program code is stored on a non-transient computer-readable medium which is connected to the control device 1 in a fixed or removable fashion. One skilled in the art will understand, however, that in alternative embodiments, functional modules configured to perform said functions can be implemented partly or fully by way of hardware components. Moreover, in alternative embodiments, the processor 14 is arranged, fully or partly, in different components of the HVAC system 100, for example in the actuator 11, the flow sensor 13, or the building control system 4.

Figure 2:
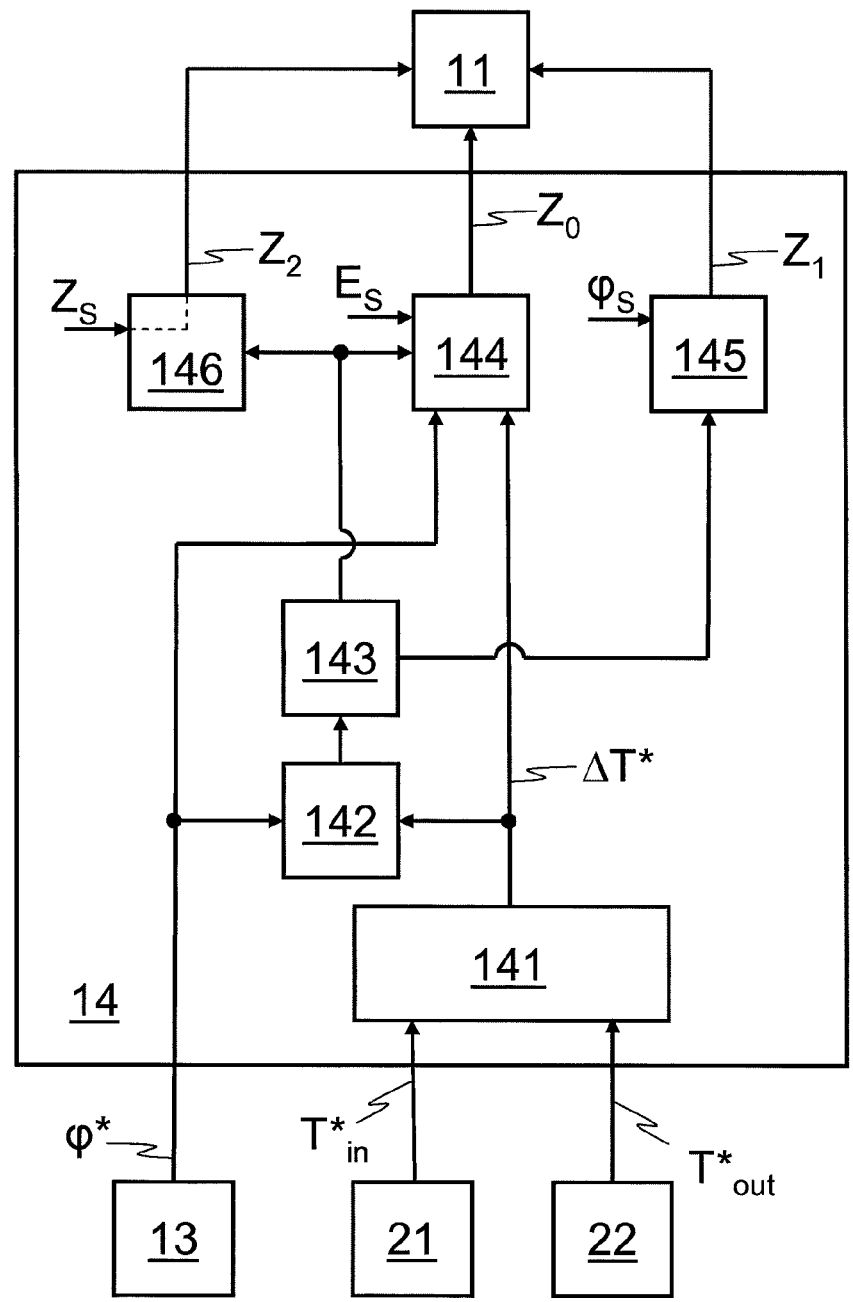
FIG. 2: shows the major functional units that are hosted on a processor of the control device in operation together with main functional links between those units.
Figure 3:
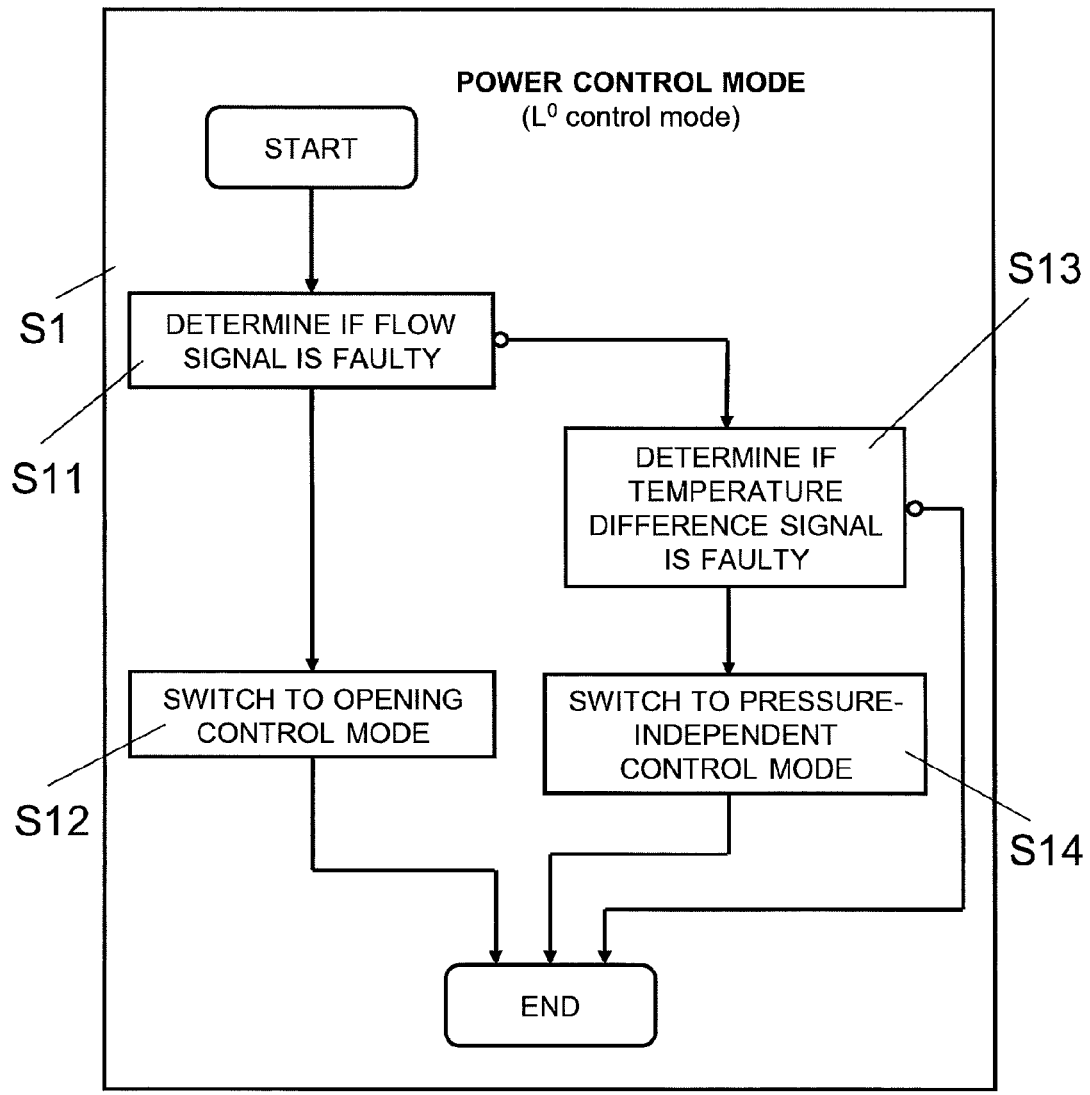
FIG. 3: shows a flow diagram illustrating steps for sensor testing and control mode switching when controlling the opening of the valve in a power control mode.
Figure 4:
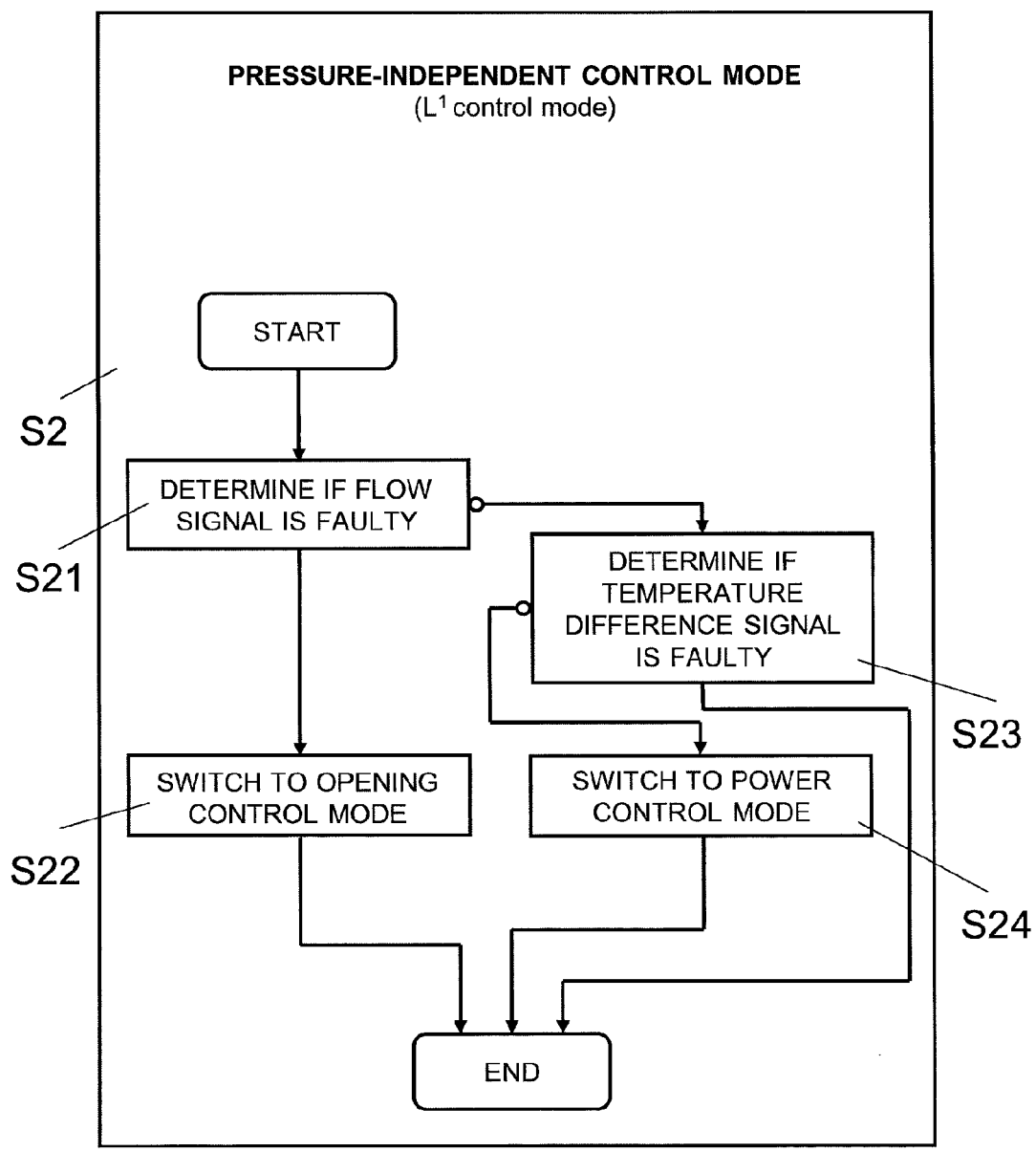
FIG. 4: shows a flow diagram illustrating steps for sensor testing and control mode switching when controlling the opening of the valve in a pressure-independent control mode.
Figure 5:
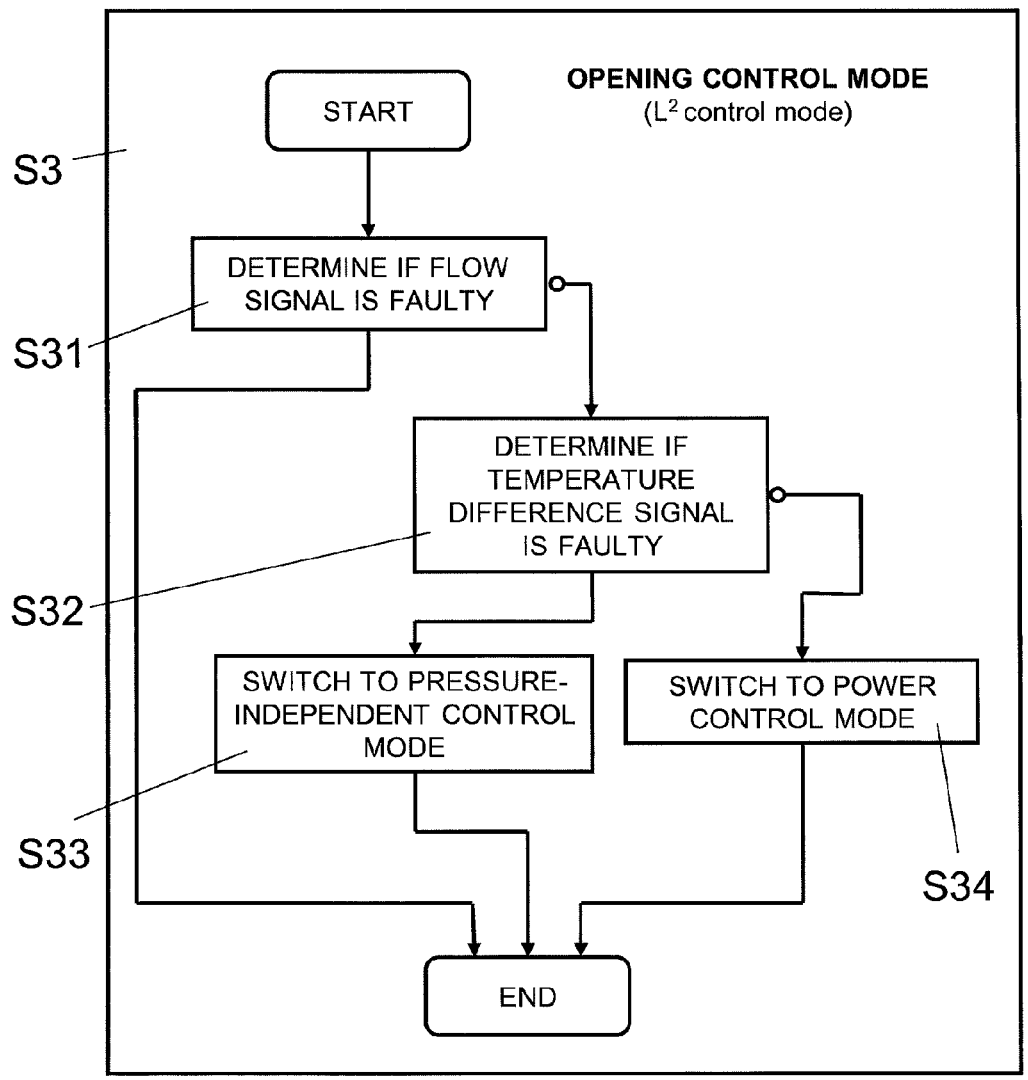
FIG. 5: shows a flow diagram illustrating steps for sensor testing and control mode switching when controlling the opening of the valve in an opening control mode.

It is further noted that FIG. 2, as well as the flow diagrams of FIGS. 3 to 5, only consider mode switching in the context of faulty sensor signals. Additionally, however, user-controlled mode switching to a user-selected control mode may be available, for example as an override control mode. In such an override control mode, the control unit is forced to control the opening of the valve 11 according to the override control mode, independently of the default control mode. In some embodiments, a fallback control mode to which control may switch automatically, in case of a faulty sensor signal, may additionally serve as a manually selectable override control mode.

As is illustrated in FIG. 1, the flow sensor 13 is connected to a main unit of the control device 1 for providing timely or current-time measurement values of the flow φ to the control device 1. Furthermore, the control device 1 is connected to the actuator 11 for supplying a control signal Z to the actuator 11 for controlling the actuator 11 to open and/or close the valve 10, i.e. to adjust the opening (or position or size of orifice) of the valve 10.

Moreover, the temperature sensors 21, 22 of the heat exchanger 2 are connected to a main unit of the control device 1 for providing to the control device 1 timely or current-time measurement values of the supply temperature $T_{in}$ and the return temperature $T_{out}$ of the fluid entering or exiting the heat exchanger 2, respectively.

Optionally, the control device 1 is further connected to the building control system 4 for receiving from the building control system 4 control signals s and/or parameters, for example user settings for a desired room temperature, and/or measurement values, such as the load demand (for example from zero BTU to maximum BTU) or a transport energy per time, $E_T$, i.e. the transport power, that is currently used by the pump 3 to transport the fluid through the fluid circuit 101. The transport power energy per time, $E_T$, can be measured by an optional power measurement unit 31. Based on the transport energy per time, $E_T$, that is used by a plurality of pumps 3 and received at the building control system 4 from a plurality of fluid circuits 101 (through transmission in push mode or retrieval in pull mode), the building control system 4 may be configured to optimize the overall efficiency of the HVAC system 100, for example by setting the flow φ through the valve 10 of one or more fluid circuits 101 based on the total value of the transport energy per time, $E_T$, that is used by all the pumps 3 of the HVAC system 100. In an alternative or additional embodiment, a power sensor arranged at the pump 3 is connected directly to the control device 1 for providing the current measurement value of the transport time, $E_T$, to the control device 1.

In the example of FIG. 1, the building control system further provides, as input to the control device 1, a set point value $E_S$ for the energy per time, setpoint E, that is exchanged by the heat exchanger 2.

In a variant, the HVAC system 100 further comprises sensors which are arranged in the space where the heat exchanger 2 is located, for example a humidity sensor, for measuring the humidity of the air in the room where the heat exchanger 2 is arranged, a temperature sensor for measuring the air temperature in the space around the heat exchanger 2, and/or an air flow sensor, for measuring the air flow across the heat exchanger 2. The sensor signals that are generated by such sensors may be processed by the control device 1 and/or the building control system 4. Faulty sensor signals originating from those sensors may be handled in the same way as the signals from the flow sensor 11 and the temperature sensors 21, 22 in accordance with the present invention.

In the following paragraphs, reference is additionally made to FIG. 2, showing the major functional units that are hosted on the processor 14 together with main functional links between those units and additional associated functional and structural units and components.

It is to be noted, that the functional units which are hosted on the processor 14 may also be distributed over a number of hardware components and may further be implemented, fully or partly, by discrete analogue and/or digital hardware components. Those functional units, like other structural and functional units of the control device 1, may further be part of a common physical unit and be accordingly arranged at a common location. Alternatively, they may be distributed over different locations of the HVAC system 100.

A difference determination unit 141 determines the temperature difference signal ΔT*, as difference of the sensor signals $T^*_{in}$, $T^*_{out}$, respectively. The temperature sensors 21, 22 and the difference determination unit 141 accordingly form, in combination, a temperature difference sensor (or a temperature difference sensor system).

As will be discussed further below in more detail, the exemplary control device 1 is configured to control the opening of the valve 10 according to a power control mode. The temperature difference signal ΔT* and the flow signal φ* accordingly are sensor sub-signals which, in combination, form the default sensor signal.

Both the flow signal φ* and the temperature difference signal ΔT* are routed to a sensor testing unit 142. It is to be noted that the temperature signals $T^*_{in}$, $T^*_{out}$ may be routed to the sensor testing unit 142 in addition or alternatively to the temperature difference signal ΔT*. The sensor testing unit 142 determines whether any of the sensor sub-signals φ*, ΔT* are faulty, by assessing the signals based on fault indicating criteria. The fault indicating criteria that are applied by the sensor testing unit 142 may, at least partly, be specific for the single sensors and largely depend on their individual design and operational characteristics. Other fault indicating criteria are generic and may be used for all or at least a variety of sensors. Some major generic fault indicating criteria will be discussed below. Depending on the embodiment, the determination, for the individual sensors and sensor signals, is based on a single criterion or a combination of several criteria. Major generic criteria that are applicable by the sensor testing unit include:

signal fluctuation: Since the measured parameters of the fluid flow can generally be expected to be stable in a steady state of the HVAC system, extensive fluctuation, in particular high-frequency fluctuation, may indicate a faulty sensor signal. A sensor signal may, for example, be considered to be faulty, if it varies over the full or a considerable portion of the sensor measurement range within a short time period. This may, occur, for example, in case of a wiring between a sensor element and subsequent circuitry, for example an instrumentation amplifier, being broken, resulting in the amplifier output floating over the hole output range in a substantially undefined way.

output range limit: A sensor signal at the upper or lower output range limit, corresponding to the sensed parameter being at the upper or lower limit of the measuring range, may, especially if occurring for an extended time period, indicate an interruption, a short circuit or some component of a sensor or the following circuitry being in a state of saturation.

plausibility check/deviation from expected value: while the actual values of the sensed parameters are not pre-known, an expected value or value range is typically known as given by the design of the HVAC system 100 and the fluid circuit 101, as well as its operating point. Significant deviation from an expected value or value range may therefore indicate a faulty sensor signal. This is the case, especially if other sensors provide signals in the expected range.

self testing routines: Some sensors, especially sensors with electronic signal conditioning and/or embedded capabilities, such as ultrasonic or inductive-magnetic flow sensors, provide integrated self testing and/or fault detection functionality. If such sensors are applied, the sensor testing unit may be configured to evaluate sensor self test results. The same applies for dedicated error signals that are provided by some sensors.

The following description only considers switching to fallback control modes that generally operate differently from the default control mode and use different control parameters. They may especially be long-term fallback control modes, as explained before in the general description. One or more additional short-term control modes in which a faulty sensor (sub-)signal is replaced may be present as well.

The sensor testing unit 142 is operatively coupled to a control mode selection unit 143. The control mode selection unit 143 is further operatively coupled to a number of control signal generators 144, 145, 146. Each of the control signal generators 144, 145, 146 is configured to alternatively generate the control signal Z for the actuator 11. The control signal generator 144 exemplarily is a standard control signal generator for generating a standard control signal $Z_0$ for controlling the opening of the valve 10 according to the default control mode. The other control signal generators 145 146 are fallback control signal generators for generating fallback control signals $Z_1$, $Z_2$ for controlling the opening of the valve 1 according to fallback control modes. The standard control signal generator 144 is exemplarily considered as generating the control signal $Z_0$ for operating the valve 10 in a power control mode as default control mode. Generation of the control signal Z is accordingly based on a setpoint energy per time value, $E_S$, setpoint, as well as on the flow signal $\varphi^*$, and the temperature difference signal $\Delta T^*$ as sensor sub-signals. As explained before, the set energy per time value, $E_S$, is exemplarily received by the control device 1 from the building control system 4. It may, however, also be input directly on a user interface of the control device 1, via some wired or wireless remote programming device, or readily stored in non-volatile memory of the processor 14.

The fallback control signal generator 145 is configured to generate a fallback control signal $Z_1$ for controlling the opening of the valve in a pressure-independent control mode as fallback control mode. Generation of the fallback control signal $Z_1$ is accordingly based on a set flow value $\varphi_S$ as input setpoint, and the flow signal $\varphi^*$ as fallback sensor signal, but not the temperature difference signal $\Delta T^*$.

The fallback control signal generator 146 is configured to generate a fallback control signal $Z_2$ for controlling the opening of the valve in an opening control mode as fallback control mode. Generation of the control signal $Z_2$ is based on a set valve opening, without considering either of the flow signal $\varphi^*$ or the difference temperature signal $\Delta T^*$. The valve actuator 11 is here considered as actuation drive which is configured to receive the control value Z indicating the desired valve opening, and controls the opening of the valve autonomously in accordance with the control signal Z, for example, based on drive internal sensors and control routines. Therefore, the control signal generator 146 merely routes the setpoint value $Z_S$ to the valve actuator 11.

The sensor testing unit 142 and the control mode selection unit 143 favourably operate in a substantially continuous way to ensure that a faulty sensor signal is reacted on with no or only negligible time delay.

In the following paragraphs, reference is additionally made to FIGS. 3, 4, 5, illustrating operation of the exemplary control device 1 with respect to sensor testing and control mode switching as schematic operational flows.

FIG. 3 illustrates sensor testing and control mode switching when controlling the opening of the valve 11 in the power control mode, referred to as step S1, as default control mode.

In a step S11, the sensor testing unit 142 determines whether the flow signal $\varphi^*$ is faulty, applying, alone or in combination, any suited fault indicating criteria, such as the before-discussed exemplary criteria. In case the flow signal $\varphi^*$ is faulty, operation proceeds with step S12 where controlling the opening of the valve is switched to the opening control mode. If the flow signal $\varphi^*$ is valid, operation proceeds with step S13 where it is determined whether the temperature difference signal $\Delta T^*$ is faulty. In this case, operation proceeds with step S14 where control of the opening of the valve is switched to the pressure-independent control mode. If the temperature difference signal $\Delta T^*$ is valid, control of the valve opening is continued in the power control mode. Starting from the power control mode as standard operation mode, either of the pressure-independent control mode or the opening control mode may accordingly serve as fallback control mode.

In a hierarchical view, the power control mode is the default control mode, which may also be referred to as zero-rank control mode ($L^0$ control mode). The pressure-independent control mode is a lower ranking $1^{st}$ rank fallback control mode ($L^1$ control mode). The opening control mode is a still lower ranking $2^{nd}$ rank fallback control mode ($L^2$ control mode). If the default sensor signal, including both the flow signal $\varphi^*$ and the temperature difference signal $\Delta T^*$ is faulty and operation in the $L^0$ control mode cannot be continued, it is tested whether operation may be continued in the $L^1$ control mode. In the affirmative case, operation is continued in this $L^1$ control mode. Only if operation can neither be continued in the $L^0$ control mode nor in the $L^1$ control mode, it is continued in the $L^2$ control mode FIG. 4 illustrates sensor testing and control mode switching when controlling the opening of the valve 11 in the pressure-independent control mode, referred to as step S2, as $L^1$ control mode.

In step S21, the sensor testing unit 142 determines whether the (previously valid) flow signal $\varphi^*$ is now faulty. If the flow signal $\varphi^*$ is faulty, operation proceeds with step S22 where control of the opening of the valve is switched to the opening control mode as $L^2$ control mode. If the flow signal $\varphi^*$ is still valid, operation proceeds with step S23 where it is determined whether the (previously faulty) temperature difference signal $\Delta T^*$ is (still) faulty. If the temperature difference signal $\Delta T^*$ is still faulty, control of the opening of the valve is continued in the pressure-independent control mode as $L^1$ control mode. If the (previously faulty) temperature difference signal $\Delta T^*$ is now valid, control of the opening of the valve is switched back to the power control mode as $L^0$ control mode in step S24. Starting from the pressure-independent control mode or as fallback control mode, the opening control mode accordingly serves as further fallback control mode, for the case that the flow signal $\varphi^*$ as fallback sensor signal becomes faulty.

FIG. 5 illustrates sensor testing and control mode switching when controlling the opening of the valve 11 in the opening control mode, referred to as step S3, as $L^2$ control mode.

In step S31, the sensor testing unit 142 determines whether the (previously faulty) flow signal $\varphi^*$ is still faulty. In case the flow signal $\varphi^*$ is still faulty, control of the opening of the valve is continued in the opening control mode as $L^2$ control mode. If the (previously faulty) flow signal $\varphi^*$ is now valid, operation proceeds with step S32 where it is determined whether the (previously faulty) temperature difference signal $\Delta T^*$ is (still) faulty. In case the temperature difference signal $\Delta T^*$ is (still) faulty, control of the opening of the valve is switched to the pressure-independent control mode as $L^1$ control mode in step S33. If the temperature difference signal $\Delta T^*$ is valid, control of the opening of the valve is switched back to the power control mode as $L^0$ control mode in step S34.

It can be seen that the hierarchical view on the control modes as explained in the context of FIG. 3 also holds true with respect to FIGS. 4 and 5. In each of the steps S2 and S3, it is tested whether operation may be continued in a higher-ranking control mode. If this is the case, operation is continued in this control mode. It is in particular continued in the highest-ranking available control mode that is available based on the available sensor (sub-)signals. If switching to a higher-ranking mode is not possible, operation is generally continued in the same mode. Only if this mode is not further available due to a further faulty sensor (sub-) signal, operation is continued in a lower-ranking control mode.

In the illustrated example, however, it is to be noted that—with three control modes being present in total—switching to both a higher-ranking control mode and a lower ranking control mode is available only in the intermediate pressure-independent control mode as $L^1$ control mode. For the highest ranking power control mode as $L^0$ control mode, only switching to lower-ranking control modes is available. For the lowest-ranking opening control mode as $L^2$ control mode, only switching to a higher-ranking control mode is available. In other embodiments, the number of control modes may be larger and a plurality of intermediate control modes may be available between the highest-ranking and the lowest-ranking control mode.

It is further noted that the hierarchy ranks are not necessarily run through in consecutive order. Starting from the highest-ranking $L^0$ control mode, operation may, in case of the sensor signal being faulty, either be continued in the $L^1$ control mode or the $L^2$ control mode, in dependence of the faulty sensor (sub-)signal. Similarly, starting from the lowest-ranking $L^2$ control mode, operation may be continued in either of the $L^1$ control mode (pressure-independent control mode) or $L^0$ control mode.

It is further noted that in the present example, only a single control mode exists on each rank, namely the power control mode as highest-ranking $L^0$ control mode, the pressure-independent control mode $L^1$ as intermediate-ranking control mode, and the lowest-ranking opening control mode $L^2$. In alternative examples, however, more than one alternative control mode may share a common rank. In a modification of the before-described embodiment, two $1^{st}$ rank fallback control modes may be available, which may be selected based on the faulty sensor (sub-)signals. For example, a further $1^{st}$ rank fallback control mode may be available in addition to the pressure-independent control mode. In this further $1^{st}$ rank fallback control mode controlling the opening of the valve may not rely on the flow signal $\varphi^*$, but may exclusively rely on the temperature difference signal $\Delta T^*$.

It is further noted that the power control mode is considered as only available default control mode for conciseness reasons. However, since a pressure-independent control mode is available as fallback control mode, the valve 10 may also be controlled to operate in the pressure-independent control mode as alternative standard operation mode, if desired. In this case, the opening control mode is available as only fallback control mode. Likewise, opening of the valve 10 may also be controlled to operate in the opening control mode as further alternative default control mode.

It should be noted that, in the description, the computer program code has been associated with specific functional modules and the sequence of the steps has been presented in a specific order, one skilled in the art will understand, however, that the computer program code may be structured differently and that the order of at least some of the steps could be altered, without deviating from the scope of the invention.

The invention claimed is:

1. A method of controlling opening of a valve in an HVAC system to regulate a flow $\varphi$ of a fluid through a heat exchanger of the HVAC system, the fluid being a heat transport medium circulating in a fluid circuit, the method including:
controlling the opening of the valve according to a default control mode in dependence of a default sensor signal, the default sensor signal being indicative of at least one parameter of the fluid;
determining, while controlling the opening of the valve according to the default control mode, whether the default sensor signal is faulty;
switching, in case of the default sensor signal being faulty, to controlling the opening of the valve according to a fallback control mode, with the opening of the valve being controlled independently of the faulty sensor signal in the fallback control mode;
determining, by a sensor testing unit in a substantially continuous way while controlling the opening of the valve according to the fallback control mode, whether the previously faulty default sensor signal is non-faulty, and
dynamically switching back to controlling the opening of the valve according to the default control mode, in case of the default sensor signal being non-faulty.

2. The method according to claim 1, wherein the method further includes controlling the opening of the valve in the fallback control mode in dependence of a fallback sensor signal; determining, while controlling the opening of the valve according to the fallback control mode, whether the fallback sensor signal is faulty; and, in case of the fallback sensor signal being faulty, switching to controlling the opening of the valve according to a further fallback control mode, with the opening of the valve being controlled independently of the faulty fallback sensor signal in the further fallback control mode.

3. The method according to claim 1, wherein the default sensor signal includes a set of sensor sub-signals, the sensor sub-signals reflecting different parameters of the fluid flow of fluid through the heat exchanger.

4. The method according to claim 1, wherein the method further includes selecting the fallback control mode from a set of alternative fallback control modes.

5. The method according to claim 4, wherein the alternative fallback control modes establish, in combination with the default control mode, a control mode hierarchy; and the method further includes selecting the fallback control mode as a highest-ranking available control mode.

6. The method according to claim 5, wherein the method further includes determining, while controlling the opening of the valve according to the fallback control mode, whether a higher ranking control mode is available, and, in case of a higher ranking control mode being available, switching to controlling the opening of the valve according to the higher-ranking control mode.

7. The method according to claim 1, wherein the default control mode is a power control mode, with an amount of energy per time, E, that is exchanged by the heat exchanger being controlled to a set point energy per time value in the power control mode.

8. The method according to claim 7, wherein the fallback control mode is a pressure-independent control mode, with the flow $\varphi$ being controlled to a setpoint flow value in the pressure-independent control mode.

9. The method according to claim 1, wherein the fallback control mode is an opening control mode, with the valve being controlled to a setpoint degree of valve opening in the opening control mode.

10. The method according to claim 1, wherein the default sensor signal includes at least one of: a flow signal $\varphi^*$, the flow signal $\varphi^*$ being indicative of the flow $\varphi$; and a temperature difference signal $\Delta T^*$, the temperature difference signal $\Delta T^*$ being indicative of a temperature difference $\Delta T = T_{in} - T_{out}$ between a supply temperature $T_{in}$ of the fluid entering the heat exchanger and a return temperature $T_{out}$ of the fluid exiting the heat exchanger.

11. The method according to claim 1, wherein the valve is a six-way-valve to fluidly couple an inlet side and an outlet side of the heat exchanger alternatively with a first fluidic circuit in a first default control mode or a second fluidic circuit in a second default control mode, and the method further includes:
selecting the default control mode as selected default control mode from the first default control mode and the alternative second default control mode; and
switching, in case of the default sensor signal being faulty, to controlling the opening of the valve according to a first fallback control mode or an alternative second fallback control mode in dependence of the selected default control mode.

12. A control device for controlling opening of a valve in an HVAC system to regulate a flow $\varphi$ of a fluid through a heat exchanger of the HVAC system, the fluid being a heat transport medium circulating in a fluid circuit, and adjust an amount of energy per time, E, that is exchanged by the heat exchanger, the control device including at least one sensor for receiving a default sensor signal, the control device further including a processor, the processor being configured:
to control the opening of the valve according to a default control mode in dependence of the default sensor signal, the default sensor signal being indicative of at least one parameter of the fluid;
to determine, while controlling the opening of the valve according to the default control mode, whether the default sensor signal is faulty;
to switch, in case of the default sensor signal being faulty, to controlling the opening of the valve according to a fallback control mode, with the opening of the valve being controlled independently of the faulty default sensor signal in the fallback control mode;
to determine, by a sensor testing unit in a substantially continuous way while controlling the opening of the valve according to the fallback control mode, whether the previously faulty default sensor signal is non-faulty, and
to dynamically switch back to controlling the opening of the valve according to the default control mode, in case of the default sensor signal being non-faulty.

13. The control device according to claim 12, wherein the at least one sensor includes at least one of a flow sensor, the flow sensor being configured to provide a flow signal $\varphi^*$ the flow signal $\varphi^*$ being indicative of the flow $\varphi$, and a temperature difference sensor, the temperature difference sensor being configured to provide a temperature difference signal $\Delta T^*$, the temperature difference signal $\Delta T^*$ being indicative of a temperature difference $\Delta T = T_{in} - T_{out}$ between a supply temperature $T_{in}$ of the fluid entering the heat exchanger and a return temperature $T_{out}$ of the fluid exiting the heat exchanger.

14. The control device according to claim 12, wherein the processor includes a sensor testing unit, the sensor testing unit being configured to determine whether the default sensor signal is faulty.

15. The control device according to claim 12, wherein the processor includes a control mode selection unit and at least two control signal generators operatively coupled to the control mode selection unit, wherein the control signal generators are configured to alternatively generate a control signal Z for an actuator, the actuator being operatively coupled to the valve for regulating the opening of the valve.

16. A computer program product including a non-transient computer readable medium having stored therein computer program code configured to direct a processor of a control device for controlling opening of a valve in an HVAC system to regulate a flow $\varphi$ of a fluid through a heat exchanger of the HVAC system, the fluid being a heat transport medium circulating in a fluid circuit, and adjust an amount of energy per time, E, that is exchanged by the heat exchanger by:
controlling the opening of the valve according to a default control mode in dependence of a default sensor signal, the default sensor signal reflecting at least one parameter of the HVAC system;
determining, while controlling the opening of the valve according to the default control mode, whether the default sensor signal is faulty;
switching, in case of the default sensor signal being faulty, to controlling the opening of the valve according to a fallback control mode, with the opening of the valve being controlled independently of the faulty default sensor signal in the fallback control mode;
determining, by a sensor testing unit in a substantially continuous way while controlling the opening of the valve according to the fallback control mode, whether the previously faulty default sensor signal is non-faulty, and
dynamically switching back to controlling the opening of the valve according to the default control mode, in case of the default sensor signal being non-faulty.

* * * * *